(12) United States Patent
Sekine et al.

(10) Patent No.: US 10,131,545 B2
(45) Date of Patent: Nov. 20, 2018

(54) AMMONIA SYNTHESIS METHOD AND CATALYST FOR AMMONIA SYNTHESIS

(71) Applicant: NIPPON SHOKUBAI CO., LTD., Osaka (JP)

(72) Inventors: Yasushi Sekine, Tokyo (JP); Hideaki Tsuneki, Osaka (JP); Masatoshi Ikeda, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 370 days.

(21) Appl. No.: 14/762,130

(22) PCT Filed: Jan. 9, 2014

(86) PCT No.: PCT/JP2014/050209
§ 371 (c)(1),
(2) Date: Jul. 20, 2015

(87) PCT Pub. No.: WO2014/115582
PCT Pub. Date: Jul. 31, 2014

(65) Prior Publication Data
US 2015/0353369 A1    Dec. 10, 2015

(30) Foreign Application Priority Data

Jan. 22, 2013 (JP) ................................ 2013-009658
Mar. 6, 2013 (JP) ................................ 2013-043615

(51) Int. Cl.
*C01C 1/04* (2006.01)
*C25B 1/00* (2006.01)
(Continued)

(52) U.S. Cl.
CPC .......... *C01C 1/0494* (2013.01); *B01J 21/066* (2013.01); *B01J 23/002* (2013.01); *B01J 23/63* (2013.01);
(Continued)

(58) Field of Classification Search
CPC .................... C25B 1/00; C01C 1/0411
See application file for complete search history.

(56) References Cited

U.S. PATENT DOCUMENTS

| 8,133,463 B1 | 3/2012 | Beny et al. |
| 2007/0014710 A1 | 1/2007 | Gerlach et al. |

(Continued)

FOREIGN PATENT DOCUMENTS

| CN | 102658135 | 9/2012 |
| CN | 102698749 | 10/2012 |

(Continued)

OTHER PUBLICATIONS

Marnellos, G.; Zisekas, S.; and Stoukides, M. "Synthesis of Ammonia at Atmospheric Pressure with the Use of Solid State Proton Conductors" Journal of Catalysis. vol. 193. Jul. 2000. pp. 80-87 (Year: 2000).*

(Continued)

*Primary Examiner* — Steven A. Friday
(74) *Attorney, Agent, or Firm* — Wenderoth, Lind & Ponack, L.L.P.

(57) ABSTRACT

A method which can efficiently produce ammonia at low temperature and low pressure and which can respond flexibly to an unsteady electrical power supply condition. In addition, a catalyst which is excellent in activity for synthesizing ammonia and which is used in a method for efficiently producing ammonia without regard to supply condition and supply location of electrical power. The method is characterized in that a reactor for synthesizing ammonia is used, and the reactor has a pair of electrodes, a voltage applying means for applying voltage between the electrodes, a catalyst between the electrodes, a raw material gas inlet port, and an ammonia-containing gas discharge port, and including introducing at least nitrogen and hydrogen as a raw material gas into the reactor for synthesizing (Continued)

ammonia, and applying a voltage to the electrodes of the reactor for synthesizing ammonia, wherein electrical discharge does not occur by the voltage.

7 Claims, 1 Drawing Sheet

(51) Int. Cl.
    B01J 37/02     (2006.01)
    B01J 21/06     (2006.01)
    B01J 23/00     (2006.01)
    B01J 35/00     (2006.01)
    B01J 23/63     (2006.01)

(52) U.S. Cl.
    CPC ....... *B01J 35/0033* (2013.01); *B01J 37/0205* (2013.01); *C01C 1/0405* (2013.01); *C25B 1/00* (2013.01); *B01J 37/0236* (2013.01); *B01J 2523/00* (2013.01); *Y02P 20/52* (2015.11)

(56) References Cited

U.S. PATENT DOCUMENTS

| | | |
|---|---|---|
| 2013/0023709 A1 | 1/2013 | Cizeron et al. |
| 2013/0183224 A1 | 7/2013 | Hosono et al. |
| 2015/0073192 A1 | 3/2015 | Cizeron et al. |
| 2015/0224482 A1 | 8/2015 | Cizeron et al. |
| 2015/0353369 A1 | 12/2015 | Sekine et al. |

FOREIGN PATENT DOCUMENTS

| | | |
|---|---|---|
| JP | 6-79177 | 3/1994 |
| JP | 8-141399 | 6/1996 |
| JP | 8-196907 | 8/1996 |
| JP | 9-168739 | 6/1997 |
| JP | 9-239272 | 9/1997 |
| JP | 2002-241774 | 8/2002 |
| JP | 2006-160581 | 6/2006 |
| JP | 2014-141361 | 8/2014 |
| WO | 2009/025835 | 2/2009 |
| WO | 2012/077658 | 6/2012 |
| WO | 2012/162526 | 11/2012 |

OTHER PUBLICATIONS

Sujitra Klinsrisuk. "Novel electrocatalytic membrane for ammonia synthesis" University of St. Andrews Ph.D. Thesis. (Year: 2010).*
Lan Li, Fang Chen, Ji-Qing Lu, and Meng-Fei Luo. "Study of Defect Sites in Ce1-xMxO2-δ (x=0.2) Solid Solutions Using Raman Spectroscopy" The Journal of Physical Chemistry A. vol. 115. Jun. 3, 2011 pp. 7972-7977 (Year: 2011).*
Elena V. Frolova, M. Ivanovskaya, V. Sadykov, G. Alikina, A. Lukashevich, S. Neophytides. "Properties of Ce—Zr—La—O nanosystem with ruthenium modified surface" Progress in Solid State Chemistry. vol. 33. Feb. 3, 2006 pp. 317-325 (Year: 2006).*
Second Notification of Office Action dated Nov. 30, 2016 in corresponding Chinese Application No. 201480005378.9 with English translation.
International Search Report dated Mar. 25, 2014 in International Application No. PCT/JP2014/050209.
"Catalyst handbook" edited by Catalysis Society of Japan, Kodansha Ltd., published on Dec. 10, 2008, pp. 536-539 (with partial translation).
Shuzo Murata and Ken-ichi Aika, "Preparation and Characterization of Chlorine-Free Ruthenium Catalysts and the Promoter Effect in Ammonia Synthesis", Journal of Catalysis, 136, pp. 110-117 (1992).
Zbigniew Kowalyczyk et al., "Studies on kinetics of ammonia synthesis over ruthenium catalyst supported on active carbon", Applied Catalysis A., 138, pp. 83-91 (1996).

Ken-ichi Aika et al., "Preparation and Characterization of Chlorine-Free Ruthenium Catalysts and the Promoter Effect in Ammonia Synthesis", Journal of Catalysis, 136, pp. 126-140 (1992).
Yusuke Niwa, Kenichi Aika, "Catalysis mechanism of Ru/CeO2 catalyst for synthesizing ammonia", 78th CATSJ Meeting Abstract No. 4A04, vol. 38, No. 6, pp. 396-399 (1996)—with partial translation.
Yu Hou et al., "Solar Energy Storage Methods", Industrial & Engineering Chemistry Research, 2011, vol. 50, pp. 8954-8964.
Journal of Hydrogen Energy Systems Society of Japan, vol. 33 (2008), No. 4, pp. 20-25 (with partial translation).
Wang, J.-D. et al. "Protonic conduction in $Ca^{2+}$-doped $La_2M_2O_7$ (M=Ce, Zr) with its application to ammonia synthesis electrochemically", Mater. Res. Bull., Apr. 26, 2005, vol. 40, No. 8, pp. 1294-1302, DOI:10.1016/j.materresbull.2005.04.08.
Lin, J. et al., "Ammonia Synthesis over Ruthenium Catalysts Using Barium-Doped Zirconia as Supports Prepared by Citric Acid Method", Chinese Journal of Catalysts, Aug. 28, 2012, vol. 33, No. 7-8, pp. 1075-1079, DOI:10.1016/S1872-2067(11)60413-0 (with partial translation).
Yasushi, S. et al., Low-Temperature Natural Gas Conversion Using Electric Discharge/Electric Field, J.Jpn. Inst. Energy., Sep. 20, 2012, vol. 91, No. 09, pp. 875-879, ISSN:0916-8753 (with partial translation).
Tanaka, K., et al. "Catalytic Oxidative Coupling of Methane Assisted by Electric Power over a Semiconductor Catalyst", Chemistry Letters, Mar. 17, 2012, vol. 41, No. 4, p. 351-353, DOI:10.1246/cl.2012.351.
Tanaka, Y. et al., "Influence of static electrical fields on catalytic oxygen reduction reaction", the lecture proceedings of 24th Fall Meeting of the Ceramic Society of Japan, Sep. 7, 2011, p. 260, 2PJ11, ISBN:978-4-931298-60-6 (with English abstract).
Wang, Z., et al. "Effect of alkali earth metals on performance of zirconium-based perovskite composite oxides supported ruthenium for ammonia synthesis", Chinese Journal of Catalysts, Feb. 5, 2013, vol. 34, No. 2, pp. 361-366, DOI:10.3724/SP.J.1088.2013.20744 (with English abstract).
Oshima, K., et al. "Methane Conversion Assisted by Plasma or Electric Field", Journal of the Japan Petroleum Institute, Mar. 1, 2013, vol. 56, No. 1, p. 11-21, DOI:10.1627/jpi.56.11.
Oshima, K. et al., "Low temperature hydrogen production by catalytic steam reforming of methane in an electric field", Int. J. Hydrogen Energy, Jan. 20, 2013, vol. 38, No. 7, p. 3003-3011, DOI:10.1016/j.ijhydene.2012.12.069.
First Office Action dated Mar. 22, 2016 in corresponding Chinese Application No. 201480005378.9, with English translation.
Jong-Sung Park et al., Low temperature sintering of $BaZrO_3$-based proton conductors for intermediate temperature solid oxide fuel cells, Solid State Ionics, vol. 181, 2010, pp. 163-167.
Office Action dated Jul. 28, 2016 in corresponding Japanese Application No. 2013-009658, with English Translation.
Office Action dated Mar. 13, 2017 in corresponding Japanese Application No. 2013-009658, with English Translation.
Office Action dated Jul. 28, 2016 in corresponding Japanese Application No. 2013-043615, with English Translation.
Office Action dated Mar. 13, 2017 in corresponding Japanese Application No. 2013-043615, with English Translation.
Extended European Search Report dated Sep. 15, 2016 in corresponding European Application No. 14743930.1.
Ya-Hong Xie et al., "Preparation of $La_{1.9}Ca_{0.1}Zr_2O_{6.95}$ with pyrochlore structure and its application in synthesis of ammonia at atmospheric pressure", Solid State Ionics, vol. 168, No. 1-2, Mar. 15, 2004, pp. 117-121.
ZhiJie Li et al., "A novel method for preparation of doped $Ba_3(Ca_{1.18}Nb_{1.82})O_{9-\delta}$: Application to ammonia synthesis at atmospheric pressure", Solid State Ionics, vol. 176, No. 11-12, Mar. 31, 2005, pp. 1063-1066.
C.G. Yiokari et al., "High-Pressure Electrochemical Promotion of Ammonia Synthesis over an Industrial Iron Catalyst", Journal of Physical Chemistry A, vol. 104, No. 46, Nov. 1, 2000, pp. 10600-10602.

(56) References Cited

OTHER PUBLICATIONS

Martha Ouzounidou et al., "Catalytic and electrocatalytic synthesis of $NH_3$ in a $H^+$ conducting cell by using an industrial Fe catalyst", Solid State Ionics, vol. 178, No. 1-2, Jan. 23, 2007, pp. 153-159.
Decision to Dismiss the Amendment issued Oct. 10, 2017 in Japanese Application No. 2013-043615, with English translation.
Decision of Refusal dated Oct. 10, 2017 in Japanese Application No. 2013-043615, with English translation.

\* cited by examiner

US 10,131,545 B2

AMMONIA SYNTHESIS METHOD AND CATALYST FOR AMMONIA SYNTHESIS

TECHNICAL FIELD

The present invention relates to a method for synthesizing ammonia by introducing a raw material gas into a reactor to obtain an ammonia-containing gas, and a catalyst which is used for ammonia synthesis.

BACKGROUND ART

Ammonia has been widely produced at an industrial level by Haber-Bosch process so far. In Haber-Bosch process, hydrogen and nitrogen are reacted using a doubly promoted iron catalyst under high-temperature and high-pressure condition of 400 to 600° C. and 20 to 40 MPa to obtain ammonia (Non-patent Document 1). In recent years, there is a case that ammonia could be synthesized under a condition of lower temperature and lower pressure by using a Ru-containing catalyst in Haber-Bosch process (Patent Document 1).

As a carrier of a general Ru-containing catalyst used for ammonia synthesis by Haber-Bosch process, a carbon carrier such as an activated carbon (Non-patent Document 3, Patent Document 2 and Patent Document 3), MgO (Non-patent Document 4) and a rare-earth oxide (Non-patent Document 5, Patent Document 1 and Patent Document 4) are used other than $Al_2O_3$ (Non-patent Document 2). $Al_2O_3$ carrier has been widely used as a catalyst carrier and can effectively prevent an active metal from agglomeration. However, an electron donation capability of $Al_2O_3$ is weaker than a basic compound, since $Al_2O_3$ is a weakly-acidic compound. A basic oxide is exemplified by a carbon material such as an active carbon, MgO and a rare-earth oxide. An electron donation capability of such a basic oxide or a carbon material such as an activated carbon is high. Hence, when the basic oxide or activated carbon is used as a carrier and even a small amount of co-catalyst component is added thereto, a highly active catalyst for synthesizing ammonia can be obtained.

As a co-catalyst component for improving an ammonia generation activity, an alkali metal, an alkaline earth metal and a rare earth are used (Non-patent Document 1). Since a co-catalyst component donates an electron to Ru, an ammonia generation activity is improved.

As a method for synthesizing ammonia, a method described in Patent Document 5 is also proposed. In the method, hydrogen gas and nitrogen gas are supplied, and the reactants are excited by generating low-temperature plasma in the presence of a catalyst.

In such an ammonia synthesis method, it is confirmed that a generation amount of ammonia can be increased by using a catalyst which is prepared by supporting Ru on MgO and adding Cs thereto as a co-catalyst component (Patent Document 6). In addition, a method described in Patent Document 7 is also proposed. In the method, the reactants are ionized using an asymmetric capacitor to synthesize ammonia.

In addition, a technology to inhibit resource depletion and global warming has been demanded. In particular, in a technical field of power generation, use of renewable energy such as solar power and wind power is increased, since renewable energy can suppress an exhaust amount of carbon dioxide, which is one of greenhouse gases, and does not depend on fossil resources. However, it is difficult to obtain stable energy from renewable energy. Hence, a method for stably storing energy for a long time by producing a chemical compound using excess electrical energy or thermal energy derived from renewable energy in order to convert the excess energy into chemical energy is developed (Non-patent Document 6). As a chemical compound which is used for storing energy, a hydrogen-containing compound such as ammonia is proposed (Non-patent Document 7). Ammonia is promising as an energy carrier, since the density of the contained hydrogen per volume and mass of ammonia is high and CO, is not discharged when ammonia is burnt.

PRIOR ART DOCUMENT

Patent Document

Patent Document 1: JPH8-141399A
Patent Document 2: JPH9-168739A
Patent Document 3: JPH9-239272A
Patent Document 4: JPH6-079177A
Patent Document 5: JP2002-241774A
Patent Document 6: WO 2009/025835
Patent Document 7: JP2006-160581A

Non-Patent Document

Non-patent Document 1: "Catalyst handbook" edited by Catalysis Society of Japan, Kodansha Ltd., published on Dec. 10, 2008, pp. 536-539
Non-patent Document 2: Journal of Catalysis, 136, pp. 110-117 (1992)
Non-patent Document 3: Applied Catalysis A., 138, pp. 83-91 (1996)
Non-patent Document 4: Journal of Catalysis, 136, pp. 126-140 (1992)
Non-patent Document 5: Yusuke NIWA, Kenichi AIKA, "Catalysis mechanism of $Ru/CeO_2$ catalyst for synthesizing ammonia", 78th CATSJ Meeting Abstract No. 4A04, Vol. 38, No. 6, (1996)
Non-patent Document 6: Industrial & Engineering Chemistry Research, 2011, Vol. 50, pp. 8954-8964
Non-patent Document 7: Journal of Hydrogen Energy Systems Society of Japan", Vol. 33 (2008), No. 4, pp. 20-25

DISCLOSURE OF THE INVENTION

Problems to be Solved by the Invention

The above-described Haber-Bosch process requires high temperature and high pressure, and a pressure-resistant reactor should be used in Haber-Bosch process. In addition, since Haber-Bosch process is suitable for large-scale production, a device for Haber-Bosch process is generally large sized and installation place thereof is restricted. Hence, renewable energy, which is eccentrically-located geographically, may not be possibly stored in an efficient manner by Haber-Bosch process. Furthermore, Haber-Bosch process is not suitable for producing ammonia with responding flexibly to a power supply condition, since it is necessary to continuously operate a device of Haber-Bosch process for a long time.

A large amount of electrical power is needed in an ammonia synthesis method in which a raw material gas is activated using plasma or an asymmetrical capacitor to obtain plasma and ion. Such a method is therefore not suitable for effectively utilizing and storing renewable energy.

Accordingly, the objective of the present invention is to provide a method which can efficiently produce ammonia at low temperature and low pressure and which can respond flexibly to an unsteady electrical power supply condition.

In addition, the objective of the present invention is to provide a catalyst which is excellent in activity for synthesizing ammonia and which is used in a method for efficiently producing ammonia without regard to supply condition and supply location of electrical power.

Means for Solving the Problems

The present inventors studied earnestly in order to solve the above-described problem. As a result, the inventors achieved the present invention by finding that the above-described problem can be solved by applying a voltage by which electric discharge does not occur, while high-voltage power such as low-temperature plasma has been conventionally considered to be necessary to accelerate an ammonia synthesis reaction. In addition, the inventors achieved the present invention by finding that a catalytically active component and a complex oxide which contains zirconium are very suitable as catalytic components for synthesizing ammonia with low voltage.

Hereinafter, the present invention is described.

[1] A method for synthesizing ammonia,
wherein a reactor for synthesizing ammonia is used, and
the reactor has a pair of electrodes, a voltage applying means for applying voltage between the electrodes, a catalyst between the electrodes, a raw material gas inlet port, and an ammonia-containing gas discharge port,
comprising the steps of:
introducing at least nitrogen and hydrogen as a raw material gas into the reactor for synthesizing ammonia, and
applying a voltage to the electrodes of the reactor for synthesizing ammonia, wherein electrical discharge does not occur by the voltage.

[2] The method according to the above [1], wherein the catalyst comprises a complex oxide and a catalytically active component, and the complex oxide contains zirconium.

[3] The method according to the above [2], wherein the complex oxide further contains at least either of an alkaline earth metal element and a rare earth element.

[4] The method according to the above [2] or [3], wherein a conductivity of the complex oxide under a mixed gas of $H_2:N_2=3:1$ by volume at 200° C. is not less than $10^{-7}$ S·cm$^{-1}$ and not more than $10^{-3}$ S·cm$^{-1}$.

[5] The method according to any one of the above [2] to [4], wherein the catalytically active component is at least one element selected from the elements of the group 6, group 7, group 8, group 9 and group 10 of the periodic table.

[6] The method according to any one of the above [2] to [5], wherein the catalyst further contains at least one element selected from the group consisting of an alkali metal element, an alkaline earth metal element and a lanthanoid element as a co-catalyst component.

[7] The method according to claim the above [6], wherein a molar ratio of the co-catalyst component relative to the catalytically active component is not less than 0.05 and not more than 3.0.

[8] The method according to any one of the above [1] to [7], wherein the voltage applied between the electrodes is set to not less than 5% and not more than 90% of a breakdown voltage under the synthesis reaction condition.

[9] The method according to any one of the above [1] to [8], wherein the distance between the electrodes is set to not less than 0.1 mm and not more than 300 mm.

[10] The method according to any one of the above [1] to [9], wherein the catalyst occupies not less than 3% and not more than 100% of the space between the electrodes.

[11] A catalyst,
used for synthesizing ammonia from nitrogen and hydrogen,
comprising a catalytically active component and a complex oxide containing zirconium,
wherein the catalyst is placed between a pair of electrodes of a reactor having a voltage applying means for applying voltage between the electrodes, a raw material gas inlet port, and an ammonia-containing gas discharge port.

[12] The catalyst according to the above [11], wherein the complex oxide further contains at least either of an alkaline earth metal element and a rare earth element.

[13] The catalyst according to the above [11] or [12], wherein a conductivity of the complex oxide under a mixed gas of $H_2:N_2=3:1$ by volume at 200° C. is not less than $10^{-7}$ S·cm$^{-1}$ and not more than $10^{-3}$ S·cm$^{-1}$.

[14] The catalyst according to any one of the above [11] to [13], wherein the catalytically active component is at least one element selected from the elements of the group 6, group 7, group 8, group 9 and group 10 of the periodic table.

[15] The catalyst according to any one of the above [11] to [14], further comprising at least one element selected from the group consisting of an alkali metal element, an alkaline earth metal element and a lanthanoid element as a co-catalyst component.

[16] The catalyst according to the above [15], wherein a molar ratio of the co-catalyst component relative to the catalytically active component is not less than 0.05 and not more than 3.0.

Effect of the Invention

In the present invention method for synthesizing ammonia, a catalytic reaction under an electric field in a non-discharge condition is utilized. As a result, ammonia can be efficiently produced depending on a supplied electrical power amount even under an unsteady electrical power supply condition in which start and stop should be alternately repeated. In addition, ammonia can be efficiently produced without using extra energy for electric discharge.

The catalyst of the present invention can be effectively used in the above-described present invention method for synthesizing ammonia.

MODE FOR CARRYING OUT THE INVENTION

The method for synthesizing ammonia according to the present invention is characterized in using the specific reactor for synthesizing ammonia, and comprising the step of introducing at least nitrogen and hydrogen as a raw material gas into the reactor for synthesizing ammonia and the step of applying a voltage to the electrodes of the reactor for synthesizing ammonia, wherein electrical discharge does not occur by the voltage.

[Reactor for Synthesizing Ammonia]

The ammonia synthesis reactor used in the present invention has a pair of electrodes, a voltage applying means for applying voltage between the electrodes, a catalyst between the electrodes, a raw material gas inlet port, and an ammonia-containing gas discharge port.

Figure 1:
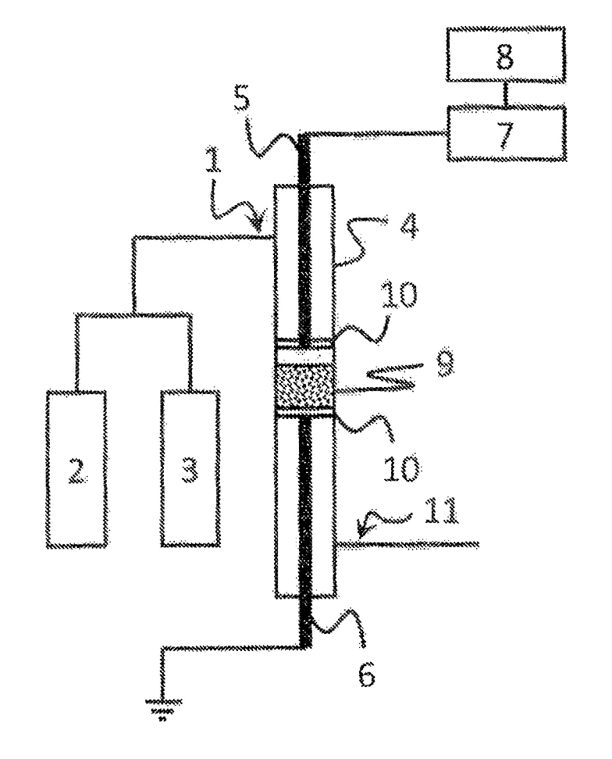
FIG. 1 is a conceptual diagram of a device which is used in the present invention for synthesizing ammonia.

FIG. 1 is a conceptual diagram of the structure which shows one of the preferable embodiments of the reactor used for synthesizing ammonia in the present invention. Hereinafter, the present invention is described using FIG. 1. The ammonia synthesis reactor has a pair of electrodes of High-voltage electrode '5' and Low-voltage electrode '6', Voltage applying means '7' for applying voltage between the electrodes, Catalyst '9' which is located between the electrodes, Raw material gas inlet port '1', and Ammonia discharge port '11'. Hereinafter, the reactor is referred to as Reactor '4' in some cases.

The material and shape of Reactor '4' is not restricted as long as the material and shape are not physically and chemically changed in the reaction condition. For example, the internal diameter may be not less than 2 mmφ and not more than 5000 mmφ, and preferably not less than 3 mmφ and not more than 5000 mmφ. The length may be not less than 5 mm and not more than 10000 mm, and preferably not less than 50 mm and not more than 5000 mm. With respect to the material, for example, a silica tube, a borosilicate glass tube and the like can be used. In addition, a SUS tube can be also used, when Electrodes '5, 6' and Reactor '4' are appropriately insulated. The reaction tube may be formed in a double tube structure which has an external cylinder such as a SUS tube in order to prevent the reaction tube from being broken.

Electrode '5' is arranged opposed to Electrode '6' by a prescribed distance in Reactor '4'. It is preferred to earth either one of Electrodes '5, 6'. In FIG. 1, Electrode '6' is earthed. It is preferred that at least one of the electrodes is contacted with Catalyst '9', and it is more preferred that both of Electrodes '5, 6' are contacted with Catalyst '9'. When the void between the electrode and catalyst is large, the efficiency may be possibly decreased since energy loss is generated due to a high void permittivity.

The material and shape of Electrodes '5, 6' are not restricted as long as the material and shape are not physically and chemically changed and the electrodes have a conducting property by which electric field can be formed in the reaction condition. For example, a rod-shaped or disk-shaped electrode can be used and the diameter thereof may be not less than 2 mmφ and not more than 5000 mmφ, and preferably not less than 3 mmφ and not more than 5000 mmφ. In addition, a plate electrode having any shape such as quadrilateral can be also used other than circle electrode. Furthermore, the electrode may be mesh other than a metal plate. The material of the electrode may be SUS, titanium alloy and the like.

The distance between Electrodes '5, 6' is not limited as long as the ammonia generating reaction can proceed when a voltage by which electric discharge does not generate is applied between the electrodes. For example, the distance between Electrodes '5, 6' is preferably not less than 0.1 mm and not more than 300 mm. When the distance between the electrodes is more than 300 mm, the efficiency may be possibly reduced by increasing needed electrical power. When the distance between the electrodes is less than 0.1 mm, electric discharge may possibly generate with no difficulty. The distance between the electrodes is more preferably not less than 1 mm and not more than 150 mm, and even more preferably not less than 3 mm and not more than 30 mm.

A voltage by which electric discharge does not generate is applied between Electrodes '5, 6' using Means for applying voltage '7'. Means for controlling voltage '8' may be used for controlling voltage so that a voltage by which electric discharge does not generate is applied. By using Means for controlling voltage '8', it becomes possible to inhibit unnecessary discharge and form a stable electric field between the electrodes. In addition, it can be inhibited to generate compounds other than ammonia by preventing electric discharge from generating between Electrodes '5, 6'. As both of Means for applying voltage '7' and Means for controlling voltage '8', commercially-available products can be utilized.

If necessary, Support means '10' can be used in order to support and fix Catalyst '9' between Electrodes '5, 6'. The distance between Catalyst '9' and Electrodes '5, 6' can be freely determined by placing Support means '10' on at least one side of Catalyst '9'. For example, it becomes possible that Catalyst '9' contacts with one electrode and does not contact with the other electrode by placing Support means '10' in contact with both of Electrodes '5, 6' and adjusting the amount of the catalyst on Support means '10'.

The material and shape of Support means '10' is not restricted as long as Support means '10' can support and fix Catalyst '9' and electrical field can be formed between Electrodes '5, 6'. For example, a ceramic porous plate, a disc-shaped support, a monolith carrier, silica wool and the like on which Catalyst '9' can be supported can be used as Support means '10'.

A means for heating catalyst can be also used. A general means for heating, such as an electric furnace, an image furnace and heat medium, can be used as the means for heating catalyst. In addition, a device for heating gas may be installed on raw material gas channel before the catalyst layer. It is particularly effective to use a means for heating when the activity of catalyst is low at the start of the reaction.

The ammonia synthesis reactor demonstrated as FIG. 1 is equipped with Nitrogen gas supply source '2' and Hydrogen gas supply source '3' as means for supplying a raw material gas. The configuration of Nitrogen gas supply source '2' is not particularly restricted as long as the gas supply source can provide nitrogen into the reactor. Such nitrogen gas supply source is exemplified by a nitrogen-containing gas cylinder and an industrial nitrogen generator. The configuration of Hydrogen gas supply source '3' is not particularly restricted as long as the gas supply source can provide hydrogen into the reactor. Such hydrogen gas supply source is exemplified by a hydrogen-containing gas cylinder, and the hydrogen gas to be used is exemplified by a hydrogen-containing gas which is obtained by reforming a hydrogen-containing compound such as a carbon hydride and a hydrogen-containing gas which is obtained by alkaline water electrolysis or water vapor electrolysis. If necessary, Nitrogen gas supply source '2' and Hydrogen gas supply source '3' may be equipped with a pump for supplying gas. The gasses are introduced into Reactor '4' through Raw material gas inlet port '1'.

In the ammonia synthesis reactor described in FIG. 1, nitrogen gas and hydrogen gas are mixed and the mixed gas is introduced into Reactor '4'. In other words, gas which contains nitrogen and hydrogen is introduced into Reactor '4' as a raw material gas. Alternatively, two Raw material gas inlet ports '1' may be installed in order to separately introduce nitrogen and hydrogen into Reactor '4'. In such a case, two Raw material gas inlet ports '1' may be adjacently installed, or a means for mixing gas, such as a fan, may be installed near two Raw material gas inlet ports '1' and Reactor '4'.

[Catalyst]

Catalyst '9' which is used in the present invention method for synthesizing ammonia is not particularly restricted as long as the catalyst accelerates the ammonia synthesis reaction from a raw material gas. The catalyst is exemplified by at least one selected from the group consisting of Pt, Rh, Pd, Ru, Ir, Ni, Co, $CeO_2$, NiO, CoO, $Co_3O_4$, CuO, ZnO, $Mn_3O_4$, $Bi_2O_3$, $SnO_2$, $Fe_2O_3$, $Fe_3O_4$, $TiO_2$, $Nb_2O_5$, MgO, $ZrO_2$, $La_2O_3$, $Sm_2O_3$, $Al_2O_3$, $SiO_2$ and CaO.

As the catalyst used in the present invention, a catalyst which contains a catalytically-active component and a complex oxide containing zirconium is particularly preferred.

1. Zirconium Complex Oxide

A zirconium complex oxide mainly plays a role as a carrier for a catalytically-active component and further improves catalytic activity of the catalytically-active component. In the present invention, it becomes further easy to produce ammonia from nitrogen and hydrogen in a very efficient way even under a voltage less than breakdown voltage by using a catalyst which contains a catalytically-active component and a zirconium-containing complex oxide.

Any zirconium complex oxide can be used as long as the complex contains zirconium oxide. Such a zirconium oxide may be crystalline and amorphous. In addition, when the zirconium oxide contains other component, the other component and zirconium may constitute a complex oxide. The other component which constitutes a complex oxide with zirconium is exemplified by at least one selected from an alkaline earth metal element and a rare earth element. Hereinafter, the exemplified other component is also referred to as 'alkaline earth metal element and/or rare earth element'. Such an alkaline earth metal element is exemplified by magnesium, calcium, strontium and barium, and is preferably strontium or barium. Such a rare earth element is exemplified by lanthanum, cerium, neodymium, praseodymium, samarium, ytterbium and yttrium, and is preferably lanthanum or cerium.

It is preferred that the electrical conductivity of the zirconium complex oxide at 200° C. in mixed gas of $H_2:N_2=3:1$ by volume is not less than $10^{-7}$ S·cm$^{-1}$ and not more than $10^{-3}$ S·cm$^{-1}$. When the complex oxide of which conductivity is less than $10^{-7}$ S·cm$^{-1}$ is used as a component of a catalyst, insulation may be possibly high and it may possibly become difficult to form an electric field. In addition, it may become easy to form discharge; as a result, energy efficiency may be possibly deteriorated. On the one hand, when the conductivity is more than $10^{-3}$ S·cm$^{-1}$, it may possibly become difficult to form electric field by due to energization of a carrier. The conductivity is more preferably not less than $10^{-6.5}$ S·cm$^{-1}$ and not more than $10^{-3.5}$ S·cm$^{-1}$, and even more preferably not less than $10^{-6}$ S·cm$^{-1}$ and not more than $10^{-3}$ S·cm$^{-1}$.

In order to measure the electrical conductivity, a substance to be measured is shaped and sintered to obtain a compact body having a relative density of 95% or more.

The electrical conductivity can be measured by a direct current four-terminal method.

Hereinafter, a raw material for zirconium complex oxide is described.

As a raw material of zirconium, a substance which is made into zirconium oxide by calcination can be used in addition to zirconium oxide and a zirconia sol. Such a raw material is exemplified by zirconium hydroxide, zirconium nitrate, zirconium carbonate and zirconyl nitrate.

As a raw material of alkaline earth metal element and/or rare earth element, any substance which is made into a complex oxide with zirconium can be used. Such a raw material is exemplified by an oxide, a nitrate, a carbonate, a sulfate and a hydroxide, and preferably an oxide, a nitrate and a carbonate.

With respect to ratios of zirconium and alkaline earth metal element and/or rare earth element in the complex oxide, a molar ratio of alkaline earth metal element and/or rare earth element when a ratio of zirconium is assumed to be 1 is preferably not less than 0.01 and not more than 10, and more preferably not less than 0.1 and not more than 1.5.

A method for preparing the complex oxide is exemplified as follows.

Polymerized Complex Method

A metal salt is dissolved in a glycol solution which excessively contains an oxycarboxylic acid to form a metal oxycarboxylic acid complex. A polyester polymer gel can be obtained by heating the solution. The obtained polyester polymer gel is thermally decomposed at high temperature to obtain the complex oxide powder.

Solid-Phase Reaction Method

Solid raw materials of zirconium oxide and an oxide or a carbonate of alkaline earth metal element and/or rare earth element are mixed, and the mixture is calcined.

Impregnation Method

Zirconium oxide is impregnated with an aqueous solution such as an alkaline earth metal element aqueous solution, and then dried and calcined.

Alternatively, an oxide such as an alkaline earth metal element oxide is impregnated with an aqueous solution of zirconium oxide, and then dried and calcined.

Coprecipitation Method

An aqueous dispersion or solution of zirconium is mixed with an aqueous solution of alkaline earth metal element and/or rare earth element, and the pH of the mixture is adjusted to obtain a precipitate. Then, the precipitate is dried and calcined.

Preferably, polymerized complex method, solid-phase reaction method or coprecipitation method is applied.

2. Catalytically Active Component

The catalytically active component means a component which accelerates a reaction for synthesizing ammonia from nitrogen and hydrogen. Such a catalytically active component is preferably at least one element selected from the elements of the group 6, group 7, group 8, group 9 and group 10 in the periodic table, more preferably at least one element selected from the group consisting of Mo, W, Fe, Ru, Co, Rh, Ni, Pd and Pt, and even more preferably at least one element selected from the group consisting of Mo, W, Fe and Ru.

As a raw material of the catalytically active component, a metal, an oxide, a nitrate, an acetate, a carbonate, a hydroxide, an oxide, a chloride, a sulfate or a hydroxide can be used. When a noble metal is used, a complex is particularly preferably used. It is preferred to use a raw material which can be dissolved in a solvent to be densely mixed with the zirconium complex oxide in comparison with a solid.

A weight ratio between the zirconium complex oxide and catalytically active component is not particularly limited as long as an electrical field is formed around the catalyst which is used for synthesizing ammonia and which is obtained from the oxide and component. A ratio of the catalytically active component relative to 100 parts by mass of the zirconium complex oxide is preferably not less than 0.01 parts by mass and not more than 50 parts by mass. When the ratio is less than 0.01 parts by mass, the catalyst activity may be possibly insufficient. On the one hand, when the ratio is more than 50 parts by mass, conductivity may be possibly high and it may possibly become difficult to form an electric field. In addition, when a noble metal is used as the catalytically active component, cost may be unfortunately increased. The ratio is more preferably not less than 0.01 parts by mass and not more than 30 parts by mass, and even more preferably not less than 0.1 parts by mass and not more than 20 parts by mass.

The ammonia synthesis catalyst is obtained by mixing the catalytically active component and the zirconium complex oxide for support. As such a production method, a conventional method can be used. For example, a method in which solid substances are mixed, precipitation method, impregnation method, incipient wetness method, evaporation to dryness method and the like can be applied.

3. Co-Catalyst Component

A co-catalyst component may be further added to the ammonia synthesis catalyst according to the present invention in order to improve ammonia generation rate. Such a co-catalyst component preferably contains at least one element selected from the group consisting of an alkali metal element, an alkaline earth metal element and a lanthanoid, more preferably at least one element selected from the group consisting of Li, Na, K, Rb, Cs, Mg, Ca, Sr, Ba, La and Ce, and even more preferably at least one element selected from the group consisting of K, Cs, Ba and La.

With respect to an amount of the co-catalyst component, a molar ratio of the co-catalyst component relative to the catalytically active component is preferably not less than 0.05 and not more than 3.0. When the ratio is less than 0.05, the addition effect may not be possibly exerted sufficiently. On the one hand, the ratio is more than 3.0, the co-catalyst component may possibly cover the active site on the catalyst surface and as a result, ammonia generation rate may be possibly decreased. The ratio is preferably not less than 0.1 and not more than 2.5.

The co-catalyst can be added in the ammonia synthesis catalyst by a conventional method. For example, a method in which solid substances are mixed, precipitation method, impregnation method, incipient wetness method, evaporation to dryness method and the like can be applied. A raw material of the co-catalyst component is not particularly restricted, and for example, a nitrate, an acetate, a carbonate, a hydroxide, an oxide and the like of the above-described element can be used.

4. Other Matters

The configuration of the ammonia synthesis catalyst according to the present invention is not restricted as long as the catalyst can be located in the reactor. For example, the configuration of the catalyst may be cylindrical, globular, Raschig ring shaped and honeycomb shaped.

The ammonia synthesis catalyst according to the present invention may be subjected to pretreatment before use if necessary. For example, in a case of using the catalyst containing Ru or Fe, ammonia generation rate can be improved by reducing the catalytically active component before adding the co-catalytic component. As such a reduction treatment, a conventional method can be applied. For example, Ru is supported on a carrier by immpregnation, and then reduction treatment is carried out at 873 K under a balance gas of 4% $H_2/N_2$ for 4 hours. In addition, the co-catalytic component is supported and then only the surface of the catalytically active component is immobilized by exposing to an atmosphere of thin oxygen. The thus obtained catalyst may be subjected to reduction treatment again when the catalyst is installed in the reactor.

An amount of the catalyst to be used is not particularly limited, and an appropriate use amount can be calculated in terms of supplied amount of a raw material gas to Reactor '4', quantity of demanded ammonia and economic efficiency. For example, 200 mg of the catalyst may be installed between Electrodes '5, 6', when hydrogen gas and nitrogen gas is supplied to Reactor '4' respectively at a rate of 45 mL/min and 15 mL/min, $Fe/Ce_{0.5}Zr_{0.5}O_2$ is used as Catalyst '9', and diameter of a reaction tube is 6 mmφ and diameter of an electrode is 3 mmφ.

It is preferred that Catalyst '9' occupies a space which corresponds to not less than 3% and not more than 100% of the space between a pair of Electrodes '5, 6'. When the ratio is less than 3%, it may be possibly difficult to generate ammonia with good efficiency since an amount of the catalyst is small. The ratio is more preferably not less than 5% and not more than 100%, and even more preferably not less than 10% and not more than 100%.

[Method for Synthesizing Ammonia]

The ammonia synthesis method according to the present invention comprises the steps of introducing at least nitrogen and hydrogen as a raw material gas into the above-described reactor for synthesizing ammonia, and applying a voltage to the above-described electrodes of the ammonia synthesis reactor, wherein electric discharge does not generate by the voltage. The order of starting the above steps is not particularly restricted. For example, the introduction of the raw material gas into the ammonia synthesis reactor is first started, and after the flow of the raw material gas is stabilized, the voltage is applied. Alternatively, the voltage is first applied between the electrodes, and then the introduction of the raw material gas is started. Furthermore, the above steps may be started simultaneously.

1. Step for Introducing Raw Material Gas

In the present invention, at least nitrogen and hydrogen are used as a raw material gas, and nitrogen and hydrogen are reacted using the catalyst to obtain ammonia.

With respect to a ratio of nitrogen and hydrogen to be used, 3 mole of hydrogen is used relative to 1 mole of nitrogen in theory. Not less than about 0.001 mole and not more than about 10 mole of hydrogen may be used relative to 1 mole of nitrogen. Under the same temperature and the same pressure, the molar ratio can be known as a volume ratio or flow rate ratio, since the molar ratio is the same as a volume ratio.

The raw material gas may contain a gas other than nitrogen gas and hydrogen gas, such as argon gas, as long as the other gas does not inhibit the reaction. However, in terms of the efficiency of the reaction, the raw material gas substantively consisting of nitrogen gas, hydrogen gas and a gas which is inevitably contained. Such an inevitably contained gas means a gas which is inevitably contained during the production of nitrogen and hydrogen. A ratio of an inevitably contained gas in the raw material gas is preferably not more than 10% by volume, more preferably not more than 5% by volume, even more preferably not more than 2% by volume, and particularly preferably not more than 1% by volume. The lower limit of the ratio of an inevitably contained gas is preferably 0% by volume, which corresponds to a detection limit of gas chromatography and the like. However, when the contamination of an inevitably contained gas is excessively limited, the total production efficiency may be possibly decreased. The lower limit is therefore more preferably 0.001% by volume, even more preferably 0.01% by volume, and particularly preferably 0.1% by volume.

An amount of nitrogen and hydrogen to be introduced into the reactor may be appropriately adjusted depending on a size of the reactor, a kind and amount of the catalyst to be used, reaction temperature and the like.

2. Step for Applying Voltage

In the present step, Catalyst '9' is preliminarily located between the electrodes of Reactor '4', and a voltage by which electric discharge does not generate is applied between the electrodes. The terms "a voltage by which electric discharge does not generate" means a voltage which is less than breakdown voltage.

More specifically, 'a voltage by which electric discharge does not generate' is less than a voltage at which dielectric breakdown occurs and spark discharge starts when electrodes are located at the same position as that of the case of actual ammonia synthesis and a raw material gas of which composition and pressure are the same as those of actual ammonia synthesis is supplied. In general, "$V_{s,i}$": breakdown voltage when "i": a gas component only is supplied can be represented as a function of "p": pressure of a raw material gas and "d": distance of electrodes in accordance with Formula '1' of Paschen's law.

$$V_{s,i} = \frac{B_i pd}{\ln \dfrac{A_i pd}{\ln\left(1 + \dfrac{1}{\gamma}\right)}} \qquad \text{Formula 1}$$

In the above formula, "$A_i$" and "$B_i$" are constants which are determined depending on a gas component, and "$\gamma$" is a constant which is dependent on an electrode material.

When a gas which exists between the electrodes is a mixture of two or more gasses, the value of breakdown voltage can be calculated in accordance with Formula '2'. Specifically, the value of "$V_{s,i}$": breakdown voltage under the gas component "i" is obtained, the value is multiplied by "$X_i$": average mole fraction of "i": gas component between the electrodes, and the calculated values summed.

$$V_s = \sum_i V_{s,i} \cdot x_i \qquad \text{Formula 2}$$

In addition, breakdown voltage is also dependent on the area of the electrode. The value of breakdown voltage becomes smaller as the area of the electrodes becomes larger. In fact, it is necessary to measure breakdown voltage, since an actual breakdown voltage is changed depending on the surface condition, usage condition and the like of the catalyst and electrode.

A method for measuring breakdown voltage in the present invention is exemplified as follows. An ammonia synthesis reactor which has the same catalyst used when ammonia is actually synthesized is build, and a device for measuring voltage applied between the electrodes and applied electric current is installed with the reactor. As such a measurement device, a commercially available oscilloscope, high voltage probe, current probe or the like can be used. The probe may be directly connected to a pair of the electrodes in order to measure the voltage and electric current. Then, voltage is applied between the electrodes using a voltage applying means, and the voltage value is gradually increased. As a result, when the voltage reaches a certain value, measured value by a current probe is suddenly increased and simultaneously measured value by a high voltage probe is suddenly decreased. Such a phenomena is evidence of breakdown. The voltage value which is measured when the phenomena is observed is referred to as 'breakdown voltage'.

As voltage which is actually applied, not less than 5% and not more than 90% of the above-described breakdown voltage is preferred. For example, when the above-described breakdown voltage is 1.5 kV, the voltage which is applied to the electrodes is preferably not less than 0.075 kV and not more than 1.35 kV. When the voltage applied to the electrodes is less than 5% of the above-described breakdown voltage, ammonia may not be effectively synthesized in some cases due to too small voltage. When the voltage applied to the electrodes is more than 90% of the above-described breakdown voltage, excessive amount of electrical energy may be used and energy efficiency of ammonia synthesis may be possibly decreased. In addition, a side reaction other than ammonia synthesis reaction may possibly proceed due to discharge. It is preferred that the ammonia synthesis method according to the present invention comprises the step of controlling the voltage applied to Electrodes '5, 6' to less than the above-described breakdown voltage in order to form a stable electrical field.

In the present invention, ammonia can be synthesized under ordinary pressure; however, the pressure may be increased if necessary. For example, the pressure in the reactor can be not less than 102 kPa and not more than 40 MPa, and preferably not less than 102 kPa and not more than 1 MPa in absolute pressure to produce an ammonia-containing gas. Ammonia generating reaction can be accelerated by increasing pressure, since high pressure is advantageous to the ammonia synthesis reaction.

An ammonia-containing gas may be produced under heating. For example, the atmosphere temperature in the reactor may be adjusted to not less than room temperature and not more than 600° C. As the temperature is raised, the catalytic activity is improved and a generation amount of ammonia is increased. On the one hand, a temperature beyond 600° C. is not preferred, since such a temperature may be thermodynamically disadvantageous to the ammonia synthesis reaction. In addition, though the reaction under lower temperature is thermodynamically advantageous, the catalytic activity may be possibly lowered. Hence, an appropriate reaction temperature may be determined under the consideration of economy within the above-described temperature range. The temperature is more preferably not less than room temperature and not more than 450° C., and even more preferably not less than room temperature and not more than 400° C.

In order to adjust the atmosphere temperature in Reactor '4' within a preferred range, for example, Reactor '4' may be heated using an electric furnace or the like. Alternatively, a heated raw material gas may be supplied into Reactor '4' in order to adjust the atmosphere temperature in Reactor '4' within a preferred range.

The obtained ammonia-containing gas passes through Ammonia discharge port '11' and is discharged from Reactor '4'. If necessary, the gas is separated into ammonia, hydrogen and nitrogen, and the separated hydrogen and nitrogen can be used again as a raw material gas.

If necessary, the ammonia synthesis method according to the present invention may be carried out in tandem or in parallel. It becomes possible by using two or more reactors to synthesize a large amount of ammonia at a time.

The present application claims the benefit of the priority dates of Japanese patent application No. 2013-9658 filed on Jan. 22, 2013, and Japanese patent application No. 2013-43615 filed on Mar. 6, 2013, and all of the contents of the Japanese patent application No. 2013-9658 filed on Jan. 22, 2013, and Japanese patent application No. 2013-43615 filed on Mar. 6, 2013, are incorporated by reference herein.

EXAMPLES

Hereinafter, the examples and comparative examples are described to demonstrate the present invention more specifically, but the present invention is in no way restricted by the examples.

Example 1

The reactor described as FIG. 1 was filled with 200 mg of $Cs_2O/Ru/Ce_{0.5}Zr_{0.5}O_2$ catalyst as Catalyst '9'. The catalyst was prepared by supporting 5 parts by mass of Ru and 6.97 parts by mass of $Cs_2O$ on 100 parts by mass of $Ce_{0.5}Zr_{0.5}O_2$. Electrodes made of SUS304 were used as Electrodes '5, 6', and the distance between the electrodes was set to be 3 mm. The distances between Electrodes '5, 6' and the catalyst layer were respectively set to be 0.5 mm and 0 mm. The temperature of the reactor was maintained at room temperature or 200° C. by using an electric furnace. A mixed gas of $H_2:N_2=3:1$ was passed through the reactor at ordinary pressure at a rate of 60 mL/min. In order to produce ammonia, a voltage which corresponded to 5 to 90% of a breakdown voltage, 1.5 kV, was applied between Electrodes '5, 6'.

Comparative Example 1

The reactor described as FIG. 1 was filled with 200 mg of $Cs_2O/Ru/Ce_{0.5}Zr_{0.5}O_2$ catalyst of which composition was the same as that of the catalyst used in Example 1 as Catalyst '9'. The temperature of the reactor was maintained at 200° C. or 300° C. by using an electric furnace. A mixed gas of $H_2:N_2=3:1$ was passed through the reactor at ordinary pressure at a rate of 60 mL/min. Ammonia was produced without applying a voltage between Electrodes '5, 6'.

Activity Evaluation of Catalyst for Synthesizing Ammonia

The concentrations of $N_2$ which was contained in the gasses before and after the catalyst layer were measured by gas chromatography. From the measurement result and gas flow rate, a $N_2$ inversion rate was calculated. A production amount of ammonia was calculated under the assumption that all of $N_2$ which was reduced after the gas was passed through the catalyst layer was changed to ammonia.

The activities of ammonia synthesis catalysts under the conditions described in Example and Comparative Example are shown in Table 1. It is demonstrated from Table 1 that significantly high ammonia generation rate can be achieved by producing ammonia with application of an electrical field in the presence of a catalyst in the ammonia synthesis reactor according to the present invention in comparison with the case before the application of an electrical field. In addition, it was clarified that ammonia can be efficiently produced under a voltage by which discharge is not generated and which is not high-voltage power such as low-temperature plasma.

TABLE 1

|  | Temperature (° C.) | Applied voltage (kV) | $N_2$ conversion rate (%) | $NH_3$ generation rate[*1] ($\mu mol \cdot h^{-1} \cdot g_{cat}^{-1}$) |
|---|---|---|---|---|
| Example 1 | 25 | 0.84 | 0.33 | 1325.89 |
|  | 200 | 0.78 | 0.5 | 2008.93 |
| Comparative Example 1 | 200 | 0 | 0.1 | 401.79 |
|  | 300 | 0 | 0.3 | 1205.36 |

[*1]generation rate of ammonia per 1 hour by using 1 g of catalyst (unit: μmol)

Example 2

As a zirconium composite oxide, $Ce_{0.5}Zr_{0.5}O_2$ which was prepared by the following method was used. First, nitrates of each metal as precursors were dissolved in pure water. The solution was added to an aqueous solution in which 3 mole of ethylene glycol and citric acid respectively per 1 mole of metal were dissolved. The mixture was heated to 75° C. using a water bath and stirred. Then, the mixture was evaporated to dryness using a hot stirrer. The obtained solid was preliminarily calcined with flowing air at 400° C. for 2 hours using a muffle furnace and then calcined with flowing air at 850° C. for 10 hours using a flow type furnace.

Next, 5 parts by mass of Ru was supported on 100 parts by mass of the zirconium composite oxide obtained by the above-described method to prepare $Ru/Ce_{0.5}Zr_{0.5}O_2$ catalyst by the following method. In 30 mL of acetone, 2 g of the zirconium composite oxide was immersed. The mixture was stirred for 2 hours using a rotary evaporator. Then, 10 mL of an acetone solution prepared by dissolving 0.259 g of $RuCl_3 \cdot 3H_2O$ as a precursor was added thereto. The mixture was stirred for 2 hours. Next, reduction procedure was carried out under atmosphere of $Ar:H_2=1:1$ at 600° C. for 4 hours using a flow type furnace. Between the electrodes of the reactor shown as FIG. 1 was filled with 0.2 g of the thus obtained catalyst.

Example 3

As a zirconium composite oxide, $Ce_{0.5}Zr_{0.5}O_2$ was used. The zirconium composite oxide was produced by a similar method to Example 2. On 100 parts by mass of the zirconium composite oxide, 5 parts by mass of Ru and 10.46 parts by mass of $Cs_2O$ were supported by a sequential impregnation method to obtain $Cs_2O/Ru/Ce_{0.5}Zr_{0.5}O_2$ catalyst. The molar ratio of Cs/Ru was 1.5. Ru and $Cs_2O$ were supported by a similar method to Example 2 except that $CsNO_3$ was used as a precursor for supporting Cs and water was used as a solvent. Between the electrodes of the reactor shown as FIG. 1 was filled with 0.2 g of the thus obtained catalyst.

Example 4

A catalyst was produced by a similar method to Example 3 except that $La_{0.1}Zr_{0.9}O_{1.95}$ which was prepared by a polymerized complex method was used as a zirconium composite oxide in place of $Ce_{0.5}Zr_{0.5}O_2$. Between the electrodes of the reactor shown as FIG. 1 was filed with 0.2 g of the catalyst.

Example 5

A catalyst was produced by a similar method to Example 3 except that $BaZr_{0.9}Y_{0.1}O_{3-\delta}$ which was prepared by a polymerized complex method was used as a zirconium composite oxide in place of $Ce_{0.5}Zr_{0.5}O_2$. Between the electrodes of the reactor shown as FIG. 1 was filled with 0.2 g of the catalyst.

Example 6

A catalyst was produced by a similar method to Example 3 except that $La_2Zr_{1.9}Y_{0.1}O_{7-\delta}$ which was prepared by a polymerized complex method was used as a zirconium composite oxide in place of $Ce_{0.5}Zr_{0.5}O_2$. Between the electrodes of the reactor shown as FIG. 1 was filled with 0.2 g of the catalyst.

Example 7

A catalyst was produced by a similar method to Example 3 except that $SrZrO_3$ which was prepared by a polymerized complex method was used as a zirconium composite oxide in place of $Ce_{0.5}Zr_{0.5}O_2$. Between the electrodes of the reactor shown as FIG. 1 was filled with 0.2 g of the catalyst.

Example 8

A catalyst was produced by a similar method to Example 3 except that $SrZr_{0.9}Y_{0.9}O_{3-\delta}$ which was prepared by a polymerized complex method was used as a zirconium composite oxide.
Between the electrodes of the reactor shown as FIG. 1 was filled with 0.2 g of the catalyst.

Example 9

As a zirconium composite oxide, $Ce_{0.5}Zr_{0.5}O_2$ was used. The zirconium composite oxide was produced by a similar method to Example 2. On 100 parts by mass of the zirconium composite oxide, 5 parts by mass of Ru and 3.48 parts by mass of $Cs_2O$ were supported by a sequential impregnation method to obtain $Cs_2O/Ru/Ce_{0.5}Zr_{0.5}O_2$ catalyst. The molar ratio of Cs/Ru was 0.5. Ru and $Cs_2O$ were supported by a similar method to Example 3. Between the electrodes of the reactor shown as FIG. 1 was filled with 0.2 g of the thus obtained catalyst.

Example 10

As a zirconium composite oxide, $Ce_{0.5}Zr_{0.5}O_2$ was used. The zirconium composite oxide was produced by a similar method to Example 2. On 100 parts by mass of the zirconium composite oxide, 5 parts by mass of Ru and 13.94 parts by mass of $Cs_2O$ were supported by a sequential impregnation method to obtain $Cs_2O/Ru/Ce_{0.5}Zr_{0.5}O_2$ catalyst. The molar ratio of Cs/Ru was 2.0. Ru and $Cs_2O$ were supported by a similar method to Example 3. Between the electrodes of the reactor shown as FIG. 1 was filled with 0.2 g of the thus obtained catalyst.

Example 11

As a zirconium composite oxide, $Ce_{0.5}Zr_{0.5}O_2$ was used. The zirconium composite oxide was produced by a similar method to Example 2. On 100 parts by mass of the zirconium composite oxide, 5 parts by mass of Ru and 7.58 parts by mass of BaO were supported by a sequential impregnation method to obtain $BaO/Ru/Ce_{0.5}Zr_{0.5}O_2$ catalyst. The molar ratio of Ba/Ru was 1.0. Ru and BaO were supported by a similar method to Example 2 except that $Ba(NO_3)_2$ was used as a precursor for supporting Ba and pure water was used as a solvent. Between the electrodes of the reactor shown as FIG. 1 was filled with 0.2 g of the thus obtained catalyst.

Example 12

As a zirconium composite oxide, $Ce_{0.5}Zr_{0.5}O_2$ was used. The zirconium composite oxide was produced by a similar method to Example 2. On 100 parts by mass of the zirconium composite oxide, 5 parts by mass of Ru and 11.38 parts by mass of BaO were supported by a sequential impregnation method to obtain $BaO/Ru/Ce_{0.5}Zr_{0.5}O_2$ catalyst. The molar ratio of Ba/Ru was 1.5. Ru and BaO were supported by a similar method to Example 11. Between the electrodes of the reactor shown as FIG. 1 was filled with 0.2 g of the thus obtained catalyst.

Comparative Example 2

In 30 mL of pure water, 2 g of commercially available $Al_2O_3$ was immersed. The mixture was stirred using a rotary evaporator for 2 hours with vacuum deaeration using an aspirator. Then, 10 mL of an aqueous solution in which $Fe(NO_3)_3 \cdot 9H_2O$ was dissolved as a precursor was added thereto. The mixture was stirred for 2 hours again. Next, the mixture was evaporated to dryness, and the obtained solid was dried using an oven under air atmosphere at 120° C. for 20 hours and further calcined in a platinum crucible under air flow at 800° C. for 1 hour. Between the electrodes of the reactor shown as FIG. 1 was filled with 0.2 g of the thus obtained $Fe/Al_2O_3$ catalyst.

Comparative Example 3

Between the electrodes of the reactor shown as FIG. 1 was filled with only 0.2 g of the zirconium composite oxide, $Ce_{0.5}Zr_{0.5}O_2$, which was prepared by the method of Example 2.

Comparative Example 4

A solid solution of which ratio of $CeO_2$:MgO was 3:1 was prepared using $CeO_2$ (standard specimen CEO-1, obtained from Japan Reference Catalyst, Catalysis Society of Japan) and MgO (special grade chemicals, manufactured by KANTO CHEMICAL CO., INC.). A catalyst was prepared by a method similar to Example 3 except that the solid solution was used as a carrier. Between the electrodes of the reactor shown as FIG. 1 was filled with 0.2 g of the catalyst.

Comparative Example 5

A catalyst was prepared by a method similar to Example 3 except that $La_{0.9}Ce_{0.1}O_{1.55}$ which was prepared by polymerized complex method was used as a zirconium complex oxide in place of $Ce_{0.5}Zr_{0.5}O_2$ was used. Between the electrodes of the reactor shown as FIG. 1 was filled with 0.2 g of the catalyst.

Activity Evaluation of Ammonia Synthesis Catalyst

Electrodes made of SUS304 were used as Electrodes '5, 6', and the distance between the electrodes was set to be 3 to 6 mm. The distances between Electrodes '5, 6' and the catalyst layer were respectively set to be 0.5 mm and 0 mm. The temperature of the reactor represented as FIG. 1 was maintained at room temperature, i.e. 25° C., or 200° C. by using an electric furnace. A mixed gas of $H_2:N_2=3:1$ by volume was passed through the reactor at ordinary pressure at a rate of 60 mL/min. In order to produce ammonia, a voltage which corresponded to 5 to 90% of a breakdown voltage was applied between Electrodes '5, 6'. The breakdown voltage was measured by experiments in the case of using each catalyst. The applied voltage and current quantity were shown in Tables 2 and 3. In the Tables, 'discharge' means the case in which electric discharge was observed, and electric discharge was not observed in the other cases.

With respect to production amount of ammonia, an amount of $N_2$ in a gas was measured before and after the gas passed through the catalyst layer by gas chromatography. The $N_2$ conversion rate was calculated from the measured result and gas flow amount under the assumption that all of the $N_2$ which was reduced after the gas passed through the catalyst layer was converted into ammonia.

The evaluation results of the activity of the ammonia synthesis catalyst produced in Examples and Comparative Examples are shown in Table 2 and Table 3. The results of the case where the reaction temperature was 25° C. are shown in Table 2 and the results of the case where the reaction temperature was 200° C. are shown in Table 3. Further, the evaluation results of Examples 1, 2, 8, 9, 10 and 11 in which a co-catalyst component was added are shown in Table 4 and Table 5. The results of the case where the reaction temperature was 25° C. are shown in Table 4 and the results of the case where the reaction temperature was 200° C. are shown in Table 5.

TABLE 2

| | | | | 25° C. | | |
|---|---|---|---|---|---|---|
| | Catalyst composition | $\log^{\sigma*1}$ | Current quantity [mA] | $N_2$ conversion rate | $NH_3$ generation rate | Applied voltage |
| Comparative Example 2 | $Fe/Al_2O_3$ | −10.88 | 4 | discharge | discharge | 0.80-1.60 |
| Comparative Example 3 | $Ce_{0.5}Zr_{0.5}O_2$ | −3.9 | 4 | N.D. | N.D. | 0.60-1.20 |
| Comparative Example 4 | $Cs_2O/Ru/CeO_2 + MgO$ (3/1) | −5.93 | 4 | 0.13 | 522.32 | 0.48 |
| Comparative Example 5 | $Cs_2O/Ru/La_{0.9}Ce_{0.1}O_{1.55}$ | −5.9 | 4 | 0.11 | 441.96 | 2.26 |
| Example 2 | $Ru/Ce_{0.5}Zr_{0.5}O_2$ | −3.9 | 4 | 0.08 | 321.43 | 0.7 |
| Example 3 | $Cs_2O/Ru/Ce_{0.5}Zr_{0.5}O_2$ | −3.9 | 4 | 0.39 | 1566.96 | 0.59 |
| Example 4 | $Cs_2O/Ru/La_{0.1}Zr_{0.9}O_{1.95}$ | −5.76 | 4 | 0.24 | 964.29 | 1.05 |
| Example 5 | $Cs_2O/Ru/BaZr_{0.9}Y_{0.1}O_{2.95}$ | −3.9 | 4 | 0.18 | 723.21 | 0.52 |
| Example 6 | $Cs_2O/Ru/La_2Y_{0.1}Zr_{1.9}O_{6.95}$ | −5.82 | 4 | 0.49 | 1968.75 | 0.77 |
| Example 7 | $Cs_2O/Ru/SrZrO_3$ | −5.96 | 4 | 0.32 | 1285.71 | 2.78 |
| Example 8 | $Cs_2O/Ru/SrZr_{0.9}Y_{0.1}O_{2.95}$ | −5.86 | 4 | 0.2 | 803.57 | 5.01 |

*1 σ means a conductivity of a carrier at 200° C. measured by the method described in the specification.

TABLE 3

| | | | | 200° C. | | |
|---|---|---|---|---|---|---|
| | Catalyst composition | $\log^{\sigma*1}$ | Current quantity [mA] | $N_2$ conversion rate | $NH_3$ generation rate | Applied voltage |
| Comparative Example 2 | $Fe/Al_2O_3$ | −10.88 | 4 | discharge | discharge | 0.80-1.60 |
| Comparative Example 3 | $Ce_{0.5}Zr_{0.5}O_2$ | −3.9 | 4 | N.D. | N.D. | 0.60-1.20 |
| Comparative Example 4 | $Cs_2O/Ru/CeO_2 + MgO$ (3/1) | −5.93 | 4 | 0.14 | 562.5 | 0.25 |
| Comparative Example 5 | $Cs_2O/Ru/La_{0.9}Ce_{0.1}O_{1.55}$ | −5.9 | 4 | 0.09 | 361.61 | 1.38 |
| Example 2 | $Ru/Ce_{0.5}Zr_{0.5}O_2$ | −3.9 | 4 | 0.08 | 321.43 | 0.62 |
| Example 3 | $Cs_2O/Ru/Ce_{0.5}Zr_{0.5}O_2$ | −3.9 | 4 | 0.46 | 1848.21 | 0.60 |
| Example 4 | $Cs_2O/Ru/La_{0.1}Zr_{0.9}O_{1.95}$ | −5.76 | 4 | 0.42 | 1687.5 | 0.84 |
| Example 5 | $Cs_2O/Ru/BaZr_{0.9}Y_{0.1}O_{2.95}$ | −3.9 | 4 | 0.36 | 1446.43 | 0.47 |
| Example 6 | $Cs_2O/Ru/La_2Y_{0.1}Zr_{1.9}O_{6.95}$ | −5.82 | 4 | 0.7 | 2812.5 | 0.81 |
| Example 7 | $Cs_2O/Ru/SrZrO_3$ | −5.96 | 4 | 0.54 | 2169.64 | 1.04 |
| Example 8 | $Cs_2O/Ru/SrZr_{0.9}Y_{0.1}O_{2.95}$ | −5.86 | 4 | 0.37 | 1486.61 | 0.79 |

*1 σ means a conductivity of a carrier at 200° C. measured by the method described in the specification.

TABLE 4

| | | | | 25° C. | | |
|---|---|---|---|---|---|---|
| | Added element | Added element/Ru (molar ratio) | Current quantity [mA] | $N_2$ conversion rate | $NH_3$ generation rate | Applied voltage |
| Example 2 | none | 0 | 4 | 0.08 | 321.43 | 0.7 |
| Example 3 | Cs | 1.5 | 4 | 0.39 | 1566.96 | 0.59 |

TABLE 4-continued

| | | | 25° C. | | |
| | Added element | Added element/Ru (molar ratio) | Current quantity [mA] | N₂ conversion rate | NH₃ generation rate | Applied voltage |
|---|---|---|---|---|---|---|
| Example 9 | Cs | 0.5 | 4 | 0.26 | 1044.64 | 0.67 |
| Example 10 | Cs | 2 | 4 | 0.17 | 683.04 | 0.62 |
| Example 11 | Ba | 1 | 4 | 0.35 | 1406.25 | 0.88 |
| Example 12 | Ba | 1.5 | 4 | 0.18 | 723.21 | 0.82 |

TABLE 5

| | | | 200° C. | | |
| | Added element | Added element/Ru (molar ratio) | Current quantity [mA] | $N_2$ conversion rate | $NH_3$ generation rate | Applied voltage |
|---|---|---|---|---|---|---|
| Example 2 | none | 0 | 4 | 0.08 | 321.43 | 0.62 |
| Example 3 | Cs | 1.5 | 4 | 0.46 | 1848.21 | 0.6 |
| Example 9 | Cs | 0.5 | 4 | 0.3 | 1205.36 | 0.54 |
| Example 10 | Cs | 2 | 4 | 0.23 | 924.11 | 0.56 |
| Example 11 | Ba | 1 | 4 | 0.37 | 1486.61 | 0.72 |
| Example 12 | Ba | 1.5 | 4 | 0.25 | 1004.46 | 0.69 |

It was clearly demonstrated in Table 2 and Table 3 that when a complex oxide containing zirconia is used as a carrier, ammonia generation rate can be improved, and when elements of from the group 6 to group 10 of the periodic table are supported as catalytically active components, ammonia generation rate can be further improved.

In addition, it was also clearly demonstrated in Table 4 and Table 5 that when a co-catalyst component is added, ammonia generation rate can be improved. With respect to the amount of a co-catalyst component which is supported, when a molar ratio of [co-catalyst component]/[catalytically active metal] both of which are converted into an elementary metal is not less than 0.05 and not more than 3.0, ammonia generation rate can be dominantly improved in comparison with the case where a co-catalyst component is not added.

INDUSTRIAL APPLICABILITY

According to the ammonia synthesis method of the present invention, even unstable power such as a power generated by renewable energy can be effectively converted to chemical energy, since ammonia can be synthesized with good efficiency under comparatively low voltage.

In addition, the catalyst for synthesizing ammonia according to the present invention can be used with advantage in various field which needs ammonia, since the catalyst can respond flexibly to unstable electrical power supply in comparison with the case of ammonia synthesis by Haber-Bosch process, and ammonia can be efficiently synthesized by using the catalyst. For example, the present invention catalyst can be used for storing renewable energy which is excessively supplied. Furthermore, the catalyst can be used in a fuel cell in which ammonia is utilized, a fuel gas supply source for a gas turbine, a chemical synthesis, an ammonia supply system for fertilizer in which system renewable energy is used in a remote area, a vehicle device for synthesizing ammonia to reduce $NO_x$, or the like.

EXPLANATION OF REFERRENCES

1: Raw material gas inlet port
2: Nitrogen gas supply source
3: Hydrogen gas supply source
4: Reactor
5: Electrode
6: Electrode
7: Means for applying voltage
8: Means for controlling voltage
9: Catalyst
10: Means for support
11: Ammonia discharge port

The invention claimed is:
1. A method for synthesizing ammonia, comprising the steps of:
introducing at least nitrogen and hydrogen as a raw material gas between a pair of electrodes in a reactor for synthesizing ammonia that comprises the pair of electrodes, a catalyst between the electrodes, a raw material gas inlet port, and an ammonia-containing gas discharge port, wherein the catalyst comprises a zirconium complex oxide and a catalytically-active component, wherein the zirconium complex oxide comprises zirconium oxide and cerium oxide, and wherein the catalytically-active component comprises Ru, and
applying a voltage to the electrodes of the reactor for synthesizing ammonia, wherein electrical discharge does not occur by the voltage.
2. The method according to claim 1, wherein a conductivity of the zirconium complex oxide under a mixed gas of $H_2:N_2=3:1$ by volume at 200° C. is not less than $10^{-7}$ S·cm$^{-1}$ and not more than $10^{-3}$ S·cm$^{-1}$.
3. The method according to claim 1, wherein the catalyst further contains at least one element selected from the group consisting of an alkali metal element, an alkaline earth metal element and a lanthanoid element as a co-catalyst component.
4. The method according to claim 3, wherein a molar ratio of the co-catalyst component relative to the catalytically active component is not less than 0.05 and not more than 3.0.
5. The method according to claim 1, wherein the voltage applied between the electrodes is set to not less than 5% and not more than 90% of a breakdown voltage.

6. The method according to claim 1, wherein the distance between the electrodes is set to not less than 0.1 mm and not more than 300 mm.

7. The method according to claim 1, wherein the catalyst occupies not less than 3% and not more than 100% of the space between the electrodes.

* * * * *